411-333 SR

OR RE 5,906

BEST AVAILABLE COPY

Reissue of 146416

W. M. WATSON:

Nut-Locks.

No. 5,906.

Reissued June 2, 1874.

Cited in Z Pat Office 5-4 Cls. 85 7.

Said to lock immediately.

Fig. 1

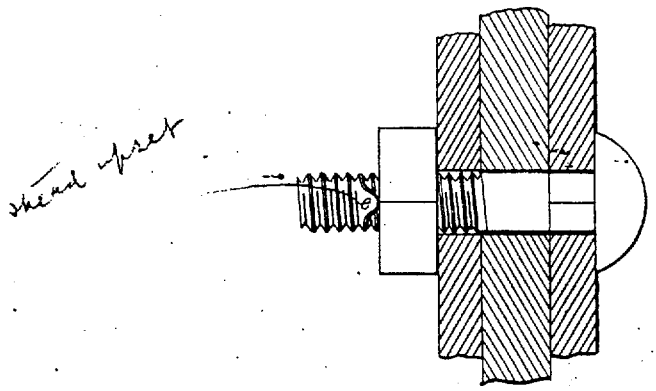

Fig. 2

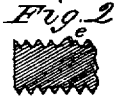

Fig. 3

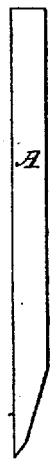

Fig. 4

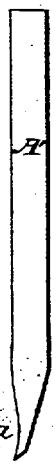

5,906.—Nut-Lock.—WILLIAM MEDD WATSON, Tonica, Ill.—Patent No. 146,416, dated January 13, 1874. Application filed February 12, 1874.

*Claim.*—1. In a nut-locking device for railroad-rails and other purposes, the method or process herein described of locking and unlocking nuts by bending the lip formed on the screw-threads out of place and restoring it again, substantially as and by the means specified.

2. The lip *e*, formed by bending the bolt-thread, substantially as and for the purpose specified.

Witnesses:
W. L. Nutt
G. G. Pratt

Inventor:
William Medd Watson

AM. PHOTO-LITHOGRAPHIC Co. N.Y. (OSBORNE'S PROCESS.)

UNITED STATES PATENT OFFICE.

WILLIAM MEDD WATSON, OF TONICA, ILLINOIS.

IMPROVEMENT IN NUT-LOCKS.

Specification forming part of Letters Patent No. 146,416, dated January 13, 1874; reissue No. 5,906, dated June 2, 1874; application filed February 12, 1874.

*To all whom it may concern:*

Be it known that I, WILLIAM MEDD WATSON, of Tonica, in the county of La Salle and State of Illinois, have invented a new and valuable Improvement in Nut-Locks; and I do hereby declare that the following is a full, clear, and exact description of the construction and operation of the same, reference being had to the annexed drawings making a part of this specification, and to the letters and figures of reference marked thereon.

Figure 1 of the drawings is a horizontal section of my nut-lock. Figs. 2, 3, and 4 are details of the same.

This invention has relation to a method of locking and unlocking nuts or bolts; and it consists in the process of bending and straightening a lip formed on the thread of the bolt at the face of the nut by means of a set-punch and key, which serve, respectively, for bending the lip on the bolt-threads after the nut has been applied, so as to prevent the nut from moving on the bolt, and for replacing the lip when it is desired to remove the nut, substantially as hereinafter more fully described.

Referring to the drawing, A A′ designate the key and set-punch. A is made with one side flat and the other beveled, to correspond with the angle of the thread on the bolt, while A′ is a flat set-punch. The set-punch is applied to the outer side of the thread on the bolt nearest the outer surface of the nut, producing a lip, *e*, which, being driven toward or against the nut, prevents the nut from jarring loose, or becoming loose otherwise accidentally.

When it is desired to remove the nut, the key A is employed for the purpose of replacing the lip on the thread of the bolt. The flat side of the key is turned toward the nut, and the nut acts as a guide, and the beveled side toward the bent lip. Then, by a suitable blow on the key, the lip is driven back to its original position, thus allowing the nut to be easily taken from the bolt.

What I claim as my invention, and desire to secure by Letters Patent, is—

1. In a nut-locking device for railroad-rails and other purposes, the method or process herein described of locking and unlocking nuts by bending the lip formed on the screw-threads out of place and restoring it again, substantially as and by the means specified.

2. The lip *e*, formed by bending the bolt-thread, substantially as and for the purpose specified.

In testimony that I claim the above I have hereunto subscribed my name in the presence of two witnesses.

WILLIAM MEDD WATSON.

Witnesses:
W. L. NUSS,
G. G. J. PRATT.